United States Patent [19]

Juroff

[11] 3,769,588

[45] Oct. 30, 1973

[54] REMOTE CONTROL SYSTEM FOR A TELEVISION RECEIVER

[75] Inventor: Lyle Bruce Juroff, Greenwood, Ind.

[73] Assignee: RCA Corporation, New York, N.Y.

[22] Filed: Sept. 11, 1972

[21] Appl. No.: 288,202

[52] U.S. Cl. .................. 325/392, 325/319, 325/401, 325/409, 325/411

[51] Int. Cl. .................. H04b 1/06

[58] Field of Search .................. 178/DIG. 15; 325/319, 390–393, 397, 411, 399–401, 404, 405, 409, 470

[56] References Cited

UNITED STATES PATENTS 3,714,578 1/1973 Valdes .................. 325/319

*Primary Examiner*—Albert J. Mayer

*Attorney*—Eugene M. Whitacre et al.

[57] ABSTRACT

A television receiver is provided having an audio signal processing circuit. The gain of the circuit is controlled by adjusting the DC bias applied to an active device in the circuit by changing the impedance between a control terminal and a point of fixed reference potential. A system controls the gain of the circuit and includes a variable impedance coupled between the control terminal and a point of fixed reference potential and a plurality of diodes coupled between the control terminal and a flip-flop circuit. The flip-flop circuit is controlled to selectively forward and reverse bias the diodes such that the total impedance between the control terminal and the point of fixed reference potential may be adjusted. The flip-flop circuit is controllable by a remotely transmitted signal and a switch positioned on the television receiver.

7 Claims, 1 Drawing Figure

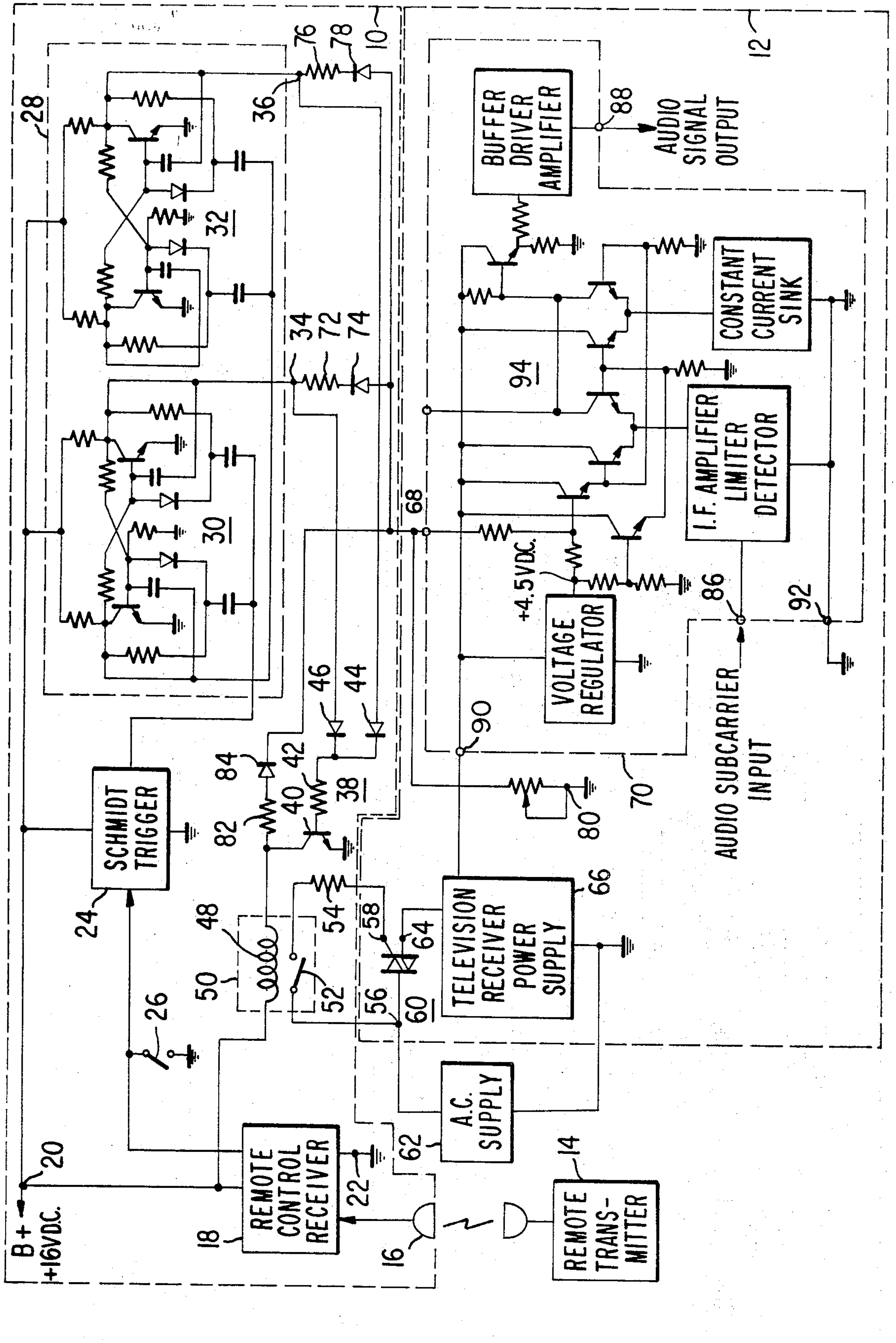
BUFFER DRIVER AMPLIFIER
AUDIO SIGNAL OUTPUT
CONSTANT CURRENT SINK
I.F. AMPLIFIER LIMITER DETECTOR
+4.5VDC.
VOLTAGE REGULATOR
AUDIO SUBCARRIER INPUT
SCHMIDT TRIGGER
TELEVISION RECEIVER POWER SUPPLY
A.C. SUPPLY
REMOTE CONTROL RECEIVER
REMOTE TRANS-MITTER
B+ +16VDC.

REMOTE CONTROL SYSTEM FOR A TELEVISION RECEIVER

The present invention relates to a remote control system for a television receiver and more particularly to a system for audio level control of a television receiver.

To enhance the demand for remote control television receivers, the cost of this add on feature must be minimized. To accomplish minimum costs, designs must be tailored to reduce the number of changes of the basic manual chassis when adding remote, and minimizing the number of add on components.

Early systems for audio level control involve the use of expensive, mechanical stepper relays and/or motorized potentiometers in the audio signal circuit of the television receiver. These systems require considerable change of the basic manual receiver design and generally a correspondingly higher remote add on cost. More recent designs have utilized electronic gain control circuits which are controlled by means of DC voltages to provide an analog control for increasing or decreasing the audio level. One such system is shown in RCA Color Television Service Data, File 1969, No. T19. Copies of the Service Data may be obtained from RCA Sales Corporation, 600 North Sherman Drive, Indianapolis, Indiana 46201.

To further reduce costs of television receivers with remote control, systems have been developed to electronically control volume level in discrete steps. A stepped remote system is shown in Motorola Service Manual CT-V, File 1972, page 36. This system, however, processes the audio signal itself and therefore requires the use of expensive shielded cables to minimize the introduction of hum. Moreover, expensive devices are required to accomplish stepping of the audio level without causing distortion.

In accordance with the present invention, a television receiver is provided having a signal processing circuit, the gain of which is controllable by adjusting the DC bias applied to at least one active device in the circuit by changing the impedance between a control terminal coupled to the circuit and a point of fixed reference potential. A system controls the gain of the signal processing circuit and includes a variable impedance coupled between the control terminal and the point of fixed reference potential and a first unidirectional current conducting device coupled between said control terminal and another terminal. A controllable storage means is coupled between the other terminal and the point of fixed reference potential. The storage means is controllable between a first stable state and a second stable state. When in the first stable state the unidirection current conducting device is biased to exhibit a high impedance. Under this condition, the total impedance between the control terminal and the point of fixed reference potential is determined by the adjustment of the variable impedance. When the storage means is in the second stable state, the unidirectional current conducting device is biased to exhibit a low impedance to reduce the total impedance between the control terminal and the point of fixed reference potential below the level established by the adjustment of the variable impedance. Control means are coupled to the controllable storage means for changing the states of the controllable storage means.

A complete understanding of the present invention may be obtained from the following detailed description thereof, when read in conjunction with the accompanying drawing, in which:

The sole FIGURE illustrates, in schematic form, a television receiver including a remote control system constructed in accordance with the present invention.

Referring now to the drawing, a remote control system 10, which is responsive to acoustic ultrasonic signals, is coupled to television receiver 12. Remote control transmitter 14 is of the type which can be hand held by the viewer and used in the control of remote control system 10.

Transducer 16 is of the type capable of converting acoustic ultrasonic signals into electrical signal and is coupled to remote control receiver 18. Receiver 18 is of the conventional type and performs the function of amplifying, frequency discriminating, detecting and integrating ultrasonic signals received by transducer 16. A source of operating potential (B+) is connected between terminal 20 and terminal 22, the latter being coupled to the reference or ground terminal of the B+ source. The output of remote control receiver 18 provides an input to Schmidt trigger 24. Switch 26 is also connected to the input of Schmidt trigger 24 and provides for control at the television receiver control panel equivalent to that accomplished by the remote transmitter. Schmidt trigger 24 being of a conventional type provides a threshold voltage below which switching occurs, and a very fast rise time negative pulse results at the output.

The output of Schmidt trigger 24 provides an input to storage circuit 28. This storage circuit includes two conventional flip-flops 30 and 32 each having a clocking input which provides for toggling of the flip-flop. The clocking input of flip-flop 30 is coupled to the output of Schmidt trigger 24.

Terminals 34 and 36 of storage circuit 28 are coupled to AC power switching network 38. This AC power switching network includes a transistor 40 which obtains its base bias from terminals 34 and/or 36 via a resistor 42 and a diode adder consisting of diode 44 and diode 46. The transistor 40 is coupled to coil 48 of relay 50 and serves as a switch to energize coil 48 from B+. The series combination of switch 52 of relay 50 and resistor 54 is connected between terminal 56 (high) and terminal 58 (gate) to provide for gating of triac 60. Triac 60 switches AC current between an AC power supply 62 and a television power supply 66.

Terminals 34 and 36 of storage circuit 28 are also coupled to terminal 68 of audio signal processing circuit 70 via a series combination of resistor 72 and diode 74 coupled to terminal 34 and a series combination of resistor 76 and diode 78 coupled to terminal 36. These resistor and diode combinations provide means for storage circuit 28 to increase audio gain above the level set by variable resistor 80 also coupled to terminal 68 of audio signal processing circuit 70.

Resistor 82 and diode 84 provide for a rapid muting of the audio integrated chip 70 when the instrument is turned off by turning off transistor 40. When transistor 40 is turned off, its collector voltage changes from approximately reference potential to B+ potential. The collector voltage, therefore, provides a bias through resistor 82 and diode 84 to terminal 68 of integrated circuit 70 which approximates a relatively high value of resistance from terminal 68 to reference potential resulting in a reduction of audio gain in audio signal processing circuit 70 to a very low level. Audio signal processing circuit 70 receives an audio subcarrier via terminal 86 and a level controlled audio signal is obtained at output terminal 88. Audio signal processing circuit 70 receives power from television receiver power supply via terminals 90 and 92.

In operation, ultrasonic signals transmitted by remote transmitter 14 are received by transducer 16, amplified, frequency scrutinized, detected and integrated in remote receiver 18. With no signal input to remote control receiver 18, its output is at nearly the B+ potential (terminal 20). If the signal level received by transducer 16 is of sufficient magnitude, the output of remote control receiver 18 is at approximately reference potential. Schmidt trigger 24, being responsive to a preset voltage level between B+ potential and reference potential, switches when the output of remote control receiver 18 goes below the switching level of Schmidt trigger 24. With no signal input to remote receiver 18, the output of Schmidt trigger 24 is at B+ potential and when switched, the output of Schmidt trigger makes a very rapid negative going transition from B+ potential and stays at that level until signal is withdrawn from transducer 16. The negative going transition at the output of Schmidt trigger 24 is applied to storage circuit 28. This negative going transition input to storage circuit 28 effects a change of the stable states of this circuit.

The two outputs from storage circuit 28 are utilized to control volume level and the off-on condition of the television receiver. Each output has two stable states, one being signified as a "0" state wherein the output terminal is connected to approximately reference potential, and a "1" state wherein this output terminal is connected to B+ potential. Output terminals 34 and 36 of storage circuit 28 have states which are interrelated and define four stable states of output of storage circuit 28. These four stable states are signified as A, B, C and D. Stable state A provides for an "off" condition of the television receiver. Stable states B, C, and D provide for an "on" condition of the television receiver with different audio levels.

In stable state A, terminal 34 is in a "0" state and is unable to provide base bias for transistor 40 via diode 46 and resistor 42. Also, terminal 36 is in a "0" state and is also unable to provide base bias to transistor 40 via diode 44 and resistor 42. Transitor 40, being in a state of cutoff for lack of sufficient base bias, has no significant collector to emitter current flow. Therefore, no current flow through coil 48 of relay 50. With no current flow through coil 48, switch 52 is open and no gate current can flow through resistor 54 to triac 60. Since triac 60 is used to switch AC current between AC supply 62 and television receiver power supply 66 and not gate current is flowing into triac 60, no current flows into television receiver power supply 66 and the television receiver 12 is "off."

In stable state B, output terminal 34 of storage circuit 28 is in a "1" state and output terminal 36 is also in a "1 " state. If either or both of these terminals are in a "1" state, transistor 40 receives sufficient base bias via diode 46 and resistor 42 or diode 44 and resistor 42 to provide for saturation of transistor 40. With transistor 40 in saturation, current flows from B+ terminal 20 through coil 48 of relay 50 and provides sufficient flux to close switch 52 in relay 50. Closure of switch 52 provides a path for triac gate current from terminal 56 to terminal 58 through resistor 54. With triac 60 gated, a maximum amount of current flows between the AC supply 62 and television receiver power supply 66 and the television receiver is turned "on." With television receiver power supply 66 turned "on," the entire television receiver 12 is operational. Therefore, audio signal processing circuit 70 is energized Audio signal processing circuit 70 has the characteristic that as the resistance from terminal 68 to reference potential is decreased, the audio gain of network 94 is increased. To provide for one adjustment of the volume level, variable resistor 80 is connected between terminal 68 and reference potential. Two additional audio levels can be selected by means of placing resistor 72 and diode 74 or resistor 76 and diode 78 between terminal 68 of audio signal processing circuit 70 and reference potential.

In stable state B, output terminal 34 of storage circuit 28 is in a "1" state providing for a reverse bias of diode 74 because B+ is more (+) than terminal 68 of audio signal processing circuit 70. Therefore, resistor 72 does not affect the current flow from terminal 68 to reference potential and therefore does not alter the audio gain of the audio signal processing circuit 70 set by variable resistor 80. Output terminal 36 of storage circuit 28 is also in a "1" state in stable state B and provides for a reverse biasing of diode 78 as explained above for diode 74. Therefore, in stable state B, variable resistor 80 is the only resistor affecting the audio gain of audio signal processing circuit 70.

In stable state C, output terminal 34 of storage circuit 28 is in a "0" state thereby providing a coupling of resistor 72 and diode 74 from terminal 68 of audio signal processing circuit 70 to reference potential. In this state, output terminal 36 of storage circuit 28 is in a "1" state providing a reverse biasing of diode 78. Resistor 76 is, therefore, not affecting the audio gain of audio signal processIng circuit 70. With both variable resistor 80 and resistor 72 connected from terminal 68 of audio signal processing circuit 70 to reference potential, the audio gain of network 94 is increased over that set by variable resistor 80 alone.

In stable state D, output terminal 34 is in a "1" state and output terminal 36 is in a "0" state. In this state, diode 74 is reverse biased and resistor 72 does not affect the audio gain of audio signal processing circuit 70. However, resistor 76 and diode 78 are coupled from terminal 68 of audio signal processing circuit 70 to reference potential. In this state, both variable resistor 80 and resistor 76 are connected from terminal 68 of audio signal processing circuit 70 to reference potential.

Resistor 72 and resistor 76 may be chosen to provide the desired incremental change of audio gain above that which is set by variable resistor 80. Since only one of the resistors 72 and 76 is connected at a time to the audio signal processing circuit 70, there is no interdependency between these resistor values in determining the magnitude of the incremental changes of audio gain level above that which is set by variable resistor 80.

The various stable states of storage circuit 28 can also be changed by means of sequentially closing and opening of switch 26 connected between the input of Schmidt trigger 24 and reference potential. This switching capability provides operation of the television receiver in the same manner on the television control panel as is possible at the remote transmitter 14.

Component values in storage circuit 28 have been chosen to provide a reset of this circuit to stable state A if B+ is interrupted for any appreciable period of time. This characteristic provides for an assurance that the instrument will not be turned on by interruptions of power service, thus providing a safety feature.

One particular configuration corresponding to that illustrated in the FIGURE is set forth below in terms of component values.

PARTS LIST

| | |
|---|---|
| Resistor **42** | 100K ohms |
| Resistor **54** | 470 ohms |
| Integrated Circuit **70** | RCA Type 3065 |
| Resistor **72** | 12K ohms |
| Resistor **76** | 5600 ohms |
| Resistor **80** | 40K ohms |
| Resistor **82** | 22K ohms |

What is claimed is:

1. In a television receiver having a signal processing circuit, the gain of which is controllable by adjusting the DC bias applied to at least one active device in said signal processing circuit by changing the impedance between a control terminal coupled to said signal processing circuit and a point of fixed reference potential, a system for controlling the gain of said signal processing circuit, comprising:

a variable impedance coupled between said control terminal and said point of fixed reference potential;

a first unidirectional current conducting device coupled between said control terminal and an other terminal;

a controllable storage means coupled between said other terminal and said point of fixed reference potential, said storage means controllable between a first stable state wherein said unidirectional current conducting device is biased to exhibit a high impedance such that the total impedance between said control terminal and said point of fixed reference potential is determined by the adjustment of said variable impedance, and a second stable state wherein said unidirectional current conducting device is biased to exhibit a low impedance to reduce the total impedance between said control terminal and said point of fixed reference potential below the level established by the adjustment of said variable impedance; and control means coupled to said controllable storage means for changing the states of the controllable storage means.

2. A system as defined in claim 1 including a resistor connected in series with said first unidirectional current conducting device.

3. A system as defined in claim 1 wherein said control means is actuatable to cause said storage means to change states in response to remotely generated signals.

4. A system as defined in claim 3 wherein said control means is additionally actuatable to cause said storage means to changes states in response to the operation of switch means located with said television receiver.

5. A system as defined in claim 1 including: a second unidirectional current conducting device coupled between said control terminal and an additional terminal, and wherein said controllable storage means is coupled to said additional terminal and is controllable to exhibit a first stable state wherein said first unidirectional current conducting device is biased to exhibit a high impedance and said second unidirectional current conducting device is biased to exhibit a high impedance, a second stable state wherein said first unidirectional current conducting device is biased to exhibit a low impedance and said second unidirectional current conducting device is biased to exhibit a high impedance, a third stable state wherein said first unidirectional current conducting device is biased to exhibit a high impedance and said second unidirectional current conducting device is biased to exhibit a low impedance, and a fourth stable state wherein said first unidirectional current conducting device is biased to exhibit a low impedance and said second unidirectional current conducting device is biased to exhibit a low impedance.

6. A system as defined in claim 5 wherein said signal processing circuit processes a modulated carrier input signal and provides an audio output signal.

7. A system as defined in claim 5 including means coupled to said control terminal for controlling the DC bias applied to said device when both said first and said second unidirectional current conducting devices are biased to exhibit a low impedance such that gain of said signal processing circuit is reduced.

* * * * *